Oct. 29, 1946.  E. C. BURDICK  2,410,335
CONTROL MECHANISM
Filed Oct. 22, 1942  3 Sheets-Sheet 1

INVENTOR.
EDWIN CLARK BURDICK.
BY
*C. B. Spangenberg*
ATTORNEY.

Oct. 29, 1946. E. C. BURDICK 2,410,335
CONTROL MECHANISM
Filed Oct. 22, 1942 3 Sheets-Sheet 2
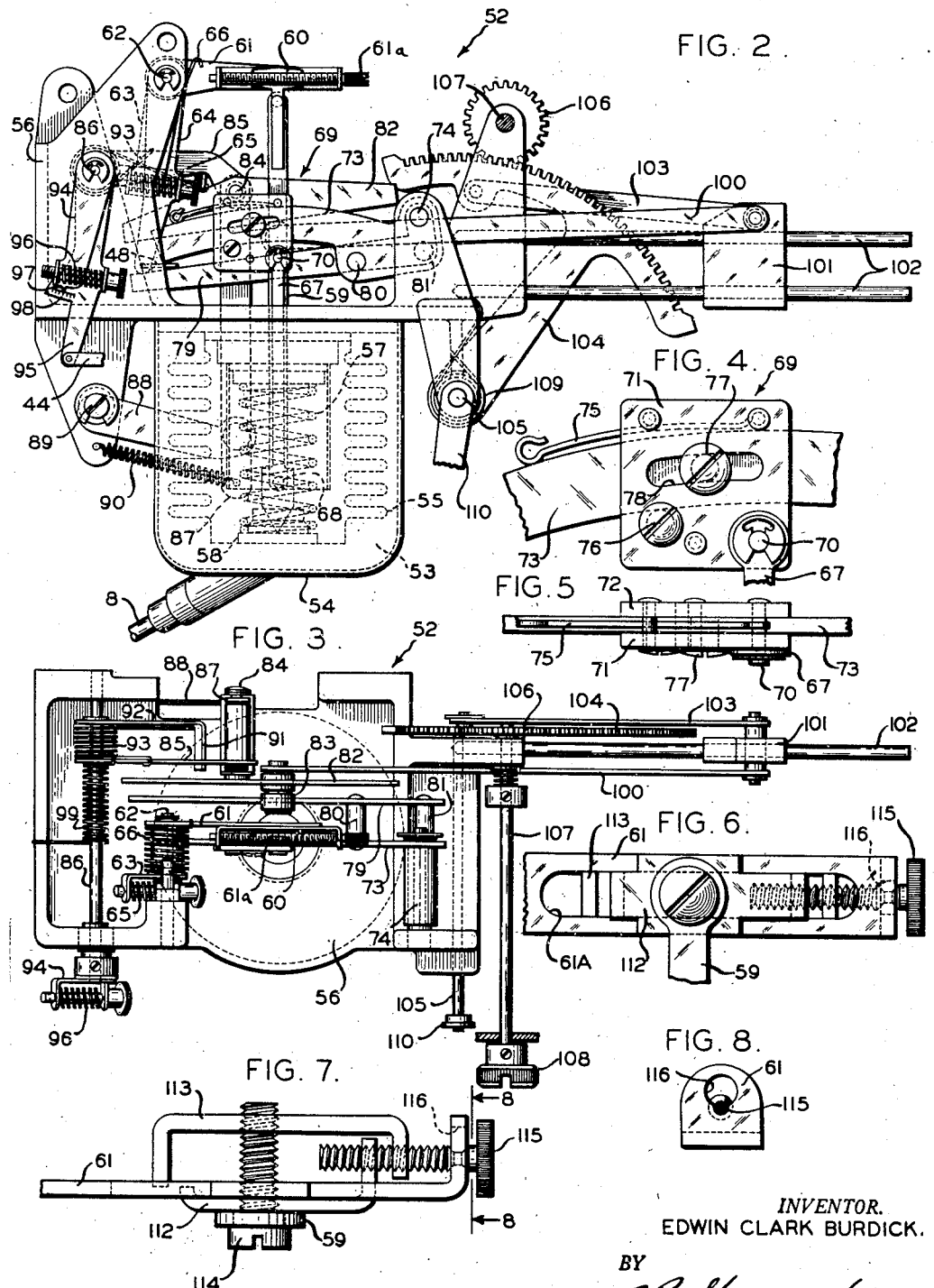
INVENTOR.
EDWIN CLARK BURDICK.
BY
E. B. Spangenberg
ATTORNEY.

Oct. 29, 1946.    E. C. BURDICK    2,410,335
CONTROL MECHANISM
Filed Oct. 22, 1942    3 Sheets-Sheet 3

INVENTOR.
EDWIN CLARK BURDICK.
BY
ATTORNEY.

Patented Oct. 29, 1946

2,410,335

UNITED STATES PATENT OFFICE 2,410,335

CONTROL MECHANISM

Edwin C. Burdick, Philadelphia, Pa., assignor to The Brown Instrument Company, Philadelphia, Pa., a corporation of Pennsylvania Application October 22, 1942, Serial No. 462,950

4 Claims. (Cl. 137—164)

The present invention relates to instruments for automatically controlling the value of some condition, and more particularly to controlling the ratio of the value of one condition with respect to the value of another condition. In the following description of the invention the primary condition will refer to the uncontrolled condition and the secondary condition will refer to the condition whose value is kept at some predetermined value with respect to that of the primary condition.

It will be obvious to those skilled in the art that the primary measuring elements that are responsive to the value of the conditions being measured and serve to adjust the control instrumentalities may be responsive to any measurable condition such as flow, temperature, pressure, or liquid level. For purposes of this description, however, the invention will be described as being used in a flow control system.

It is often necessary to control the value of one condition to a certain proportion of a second condition or to maintain the ratio between the two conditions constant. It is, accordingly, an object of the invention to provide an instrument which will exactly maintain one condition at a given ratio with respect to a second condition.

It is a further object of the invention to provide a pneumatic control instrument which is remotely actuated in response to the value of one condition to control the value of a second condition. It is a further object of the invention to provide an instrument which may be used to determine and control the ratio of the flow of a fluid through one conduit with respect to the flow through another conduit.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Fig. 2 is an enlarged view of the ratio control unit,

Fig. 3 is a top view of Figure 2,

Fig. 4 is an enlarged view of an adjustable part used in Figure 2,

Fig. 5 is a top view of Figure 4,

Figures 6 and 7 are front and top views of an alternative adjustable connection, Fig. 8 is a view on line 8—8 of Figure 7.

Figure 9:
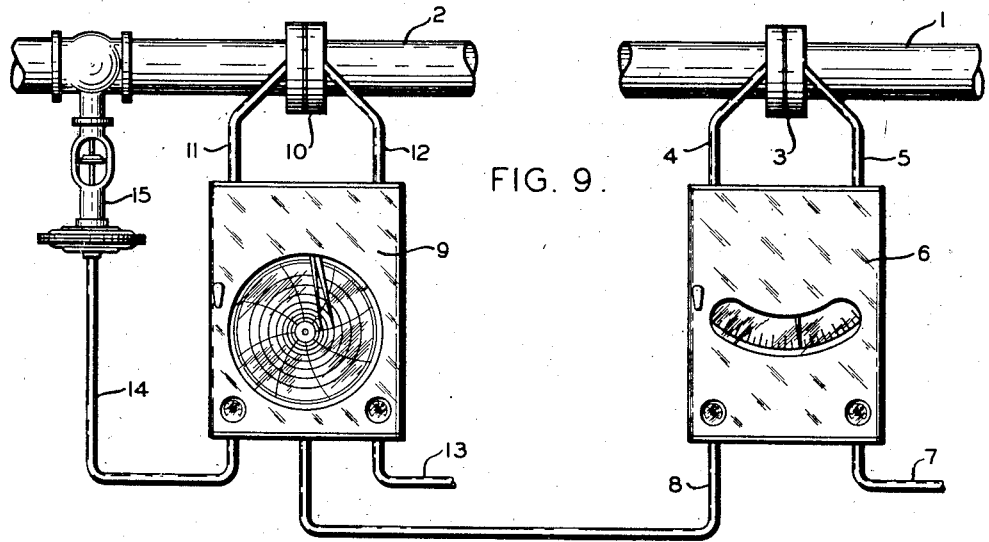
Fig. 9 is a diagrammatic view showing a flow ratio control system.

Referring first to Figure 9, there is shown a pipe 1 through which a fluid, known herein as the primary fluid, flows. There is also shown a pipe 2 through which a fluid, known herein as the secondary fluid, flows and which is to be controlled to some value that retains a given ratio with respect to the primary fluid flow at all values of flow of the latter. To this end the pipe 1 is provided with an orifice 3 from opposite sides of which pressure taps 4 and 5 are taken and which lead to a flow measuring instrument 6. This instrument, which may take the form of any well known flow meter and is shown herein as an indicator is provided with a device that sets up an air pressure which is proportional to the value of the flow being measured. Such an instrument is shown and described in the Coleman B. Moore Patent 2,311,853 granted February 23, 1943. The instrument 6 is supplied with air under a regulated pressure through a pipe 7 and modulates the air in accordance with the flow in pipe 1 and supplies this air through a pipe 8 to an instrument 9.

The pipe 2 is provided with an orifice 10, the opposite sides of which are connected by pressure taps 11 and 12 to the instrument 9 which may be provided with any conventional type of flow measuring device. The instrument 9 is also provided with a control mechanism that may be of any conventional type, but is preferably of the pneumatic type known as the Brown Air-O-Line controller such as is disclosed in the patent of Coleman B. Moore 2,125,081 dated July 26, 1938. The instrument 9 is supplied with air under a regulated pressure through pipe 13 and delivers air at variable pressures through a pipe 14 to a pneumatic control valve 15 in the secondary flow line 2. The instrument 9 therefore controls the flow in pipe 2, and this instrument has its control point adjusted pneumatically by air supplied through the pipe 8 to keep the flow in pipe 2 at some particular ratio with respect to the flow in the pipe 1.

The instrument 9 is provided with a shaft 16 that is rotated to various positions depending upon the flow through the pipe 2. This shaft can be rotated by any suitable flow measuring instrument such as the float in a differential pressure manometer, and it serves to move a pen which gives a record of the value of the flow, and to adjust the control mechanism which serves to regulate the flow in the pipe 2. The shaft 16 has attached to it an arm 17, and has free upon it an arm 18 which is adjustably connected to the arm 17 for movement therewith. To this end the arm 17 is provided with a turned up portion 19, and the arm 18 is provided with a turned up portion 20 between which portions is placed a spring 21. This spring serves to hold the arms 17 and 18 apart a distance that is adjusted by means of a screw 22 which extends through the portion 20, and is threaded into the portion 19. By rotation of the screw, the angular relation between arms 17 and 18 may be changed. The outer end of the arm 18 is provided with a slot 23 in which is adjustably mounted a slider 24 which carries the lower end of a link 25. The upper end of this link is pivoted to the outer end of an arm 26 that is fastened to a pen shaft 27. Therefore, as the shaft 16 rotates, the shaft 27 will be rotated proportional amounts to move a pen arm 28, which is attached to the shaft, back and forth across a chart 29 to make a record of the flow through pipe 2. This chart is rotated at any desired speed by means of the chart hub 30.

The shaft 27 also serves to adjust the control mechanism of the instrument 9. To this end, the shaft 27 is provided with an arm 31 that has the upper end of a link 32 attached to its outer end. The lower end of link 32 is fastened to a differential lever 33 that is pivoted to move around point 34. Attached to the mid-point of the lever 33 is the upper end of a connecting link 35 which serves to adjust the control mechanism 36 that is shown in dotted outline. The lower end of the link 35 is connected to a lever 37 which is pivoted at 38 and which serves to move a flapper 39 relative to a bleed nozzle 40. The control mechanism 36, which preferably takes the form of the control mechanism shown in the above mentioned Moore Patent 2,125,081, serves to adjust the air pressure supplied through pipe 14 to the control valve 15 as the flapper 39 is moved relative to the nozzle 40 in a manner which is fully described in the said patent, and which is well known commercially.

In order to change the control point of the mechanism 36 or to change the value at which this instrument will serve to maintain the flow through the pipe 2 it is necessary to shift the pivot point 34 of the differential lever 33. To this end, the pivot 34 is formed on the outer end of a lever 41 that is pivoted to move around a supporting shaft 42. This lever is provided with an index member or pointer 43, that cooperates with the chart 29 to indicate the value at which the instrument will tend to maintain the flow. The lever 41 and its pointer 43 are moved around the shaft 42 by means of a link 44 that is adjusted in accordance with the flow through the pipe 1. Simultaneously with the adjustment of the lever 41, a pen arm 45 is also moved across the chart 29 to make a record of the flow through the pipe 1. This pen arm is attached to a shaft 46 that is moved by means of a driving arm 47 and a driving link 48. The link 44 and the driving link 48 are simultaneously moved by a ratio control unit 52 that is located in the upper left end corner of the instrument 9, and the details of which will be presently described. It is noted that the pen arm 45 is moved directly in proportion to the flow in pipe 1, while the index pointer is moved at some predetermined ratio with respect to the flow in said pipe. In order to limit the adjustment of the control point of the instrument 9 to prevent the flow through pipe 2 from being moved beyond predetermined limits, this instrument is provided with stops 49 and 50 that are pivoted at 42, and which are adapted to be engaged by an abutment 51 on the lever 41. The stops may be adjusted to various positions around their pivot to limit the movement of the abutment, and thereby of the arm 41.

Air under a variable pressure is supplied by the instrument 6 through the pipe 8 to a chamber 53 which is formed in the ratio control unit 52. This chamber is formed between a cupshaped casing 54 and a bellows 55, both of which are fastened at their upper ends to a supporting casting 56. The bellows 55 is normally biased in a direction to elongate it to keep the chamber 53 at its minimum volume, by means of a spring 57 that has its upper end engaging an abutment formed on the casing 56 and has its lower end engaging a socket 58 that is attached to the end wall of the bellows. A change in the length of the bellows produced by a change in pressure in the chamber serves to move directly the pen 45 across the chart 29 by means of a rod 59 whose lower end engages in the socket 58 and whose upper end is attached to a lever 61 which is fastened to the rotatable shaft 62. The connection between rod 59 and lever 61 consists of a slider 60 that is provided with turned up ends which engage the threads of a screw 61a which is rotatable in a bracket attached to the lever 61. Rotation of screw 61a will move the slider toward or away from shaft 62. Also attached to the shaft 62 is an arm 63 which serves to move a second arm 64, that is free on the shaft, through an adjustable connection 65 which is similar to the connection previously described between arms 17 and 18. A spring 66 encircles the shaft 62 and serves to bias this shaft and the parts attached thereto in a clockwise direction in order to maintain the lower end of the rod 59 in engagement with the socket 58 and to prevent play between these parts.

As the pressure in the chamber 53 changes, the bellows 55 will be elongated or contracted and will operate through the rod 59, lever 61, arm 63, and arm 64, and the driving link 48 to move the pen 45 across the chart 29 in accordance with the value of the flow through pipe 1. The adjustment 60 is used to vary the effective lever arm to part 61 and thereby regulate the amount that the pen is moved for a given pressure change in the chamber 53. The adjustment 65 is used to vary the relative positions of arms 63 and 64 and thereby determine the zero position of the pen arm or the position that the pen arm will assume over the chart for any given pressure applied to the chamber 53.

Movement of the bellows 55 also serves to shift the lever 41 to adjust the control point of the instrument 9 various amounts for a given pressure change in the chamber 53. To this end there is provided a push rod 67 that is attached at its lower end to the rod 59 at the point 68. The upper end of the rod 67 is pivoted to an adjustable block 69 at point 70. This block (see Figures 4 and 5) consists of a pair of plates 71 and 72 which slidably receive between them a lever 73 that is pivoted at 74. The block is held in a given position relative to the lever 73 by means of a spring 75 which tends to pull the block upwardly until the lower edge of lever 73 is engaged by a pin 76 that extends between the plates 71 and 72. The block can be adjusted along lever 73 toward and away from the pivot 74 and is held in a given position on this lever by means of screw 77 that is threaded into the lever and a slot 78 formed in the block 71. Adjustment of the block toward or away from the pivot 74 causes the lever 73 to be moved a less or a greater amount for a given pressure change in the chamber 53. This is what is known as a calibration adjustment.

Figure 10:
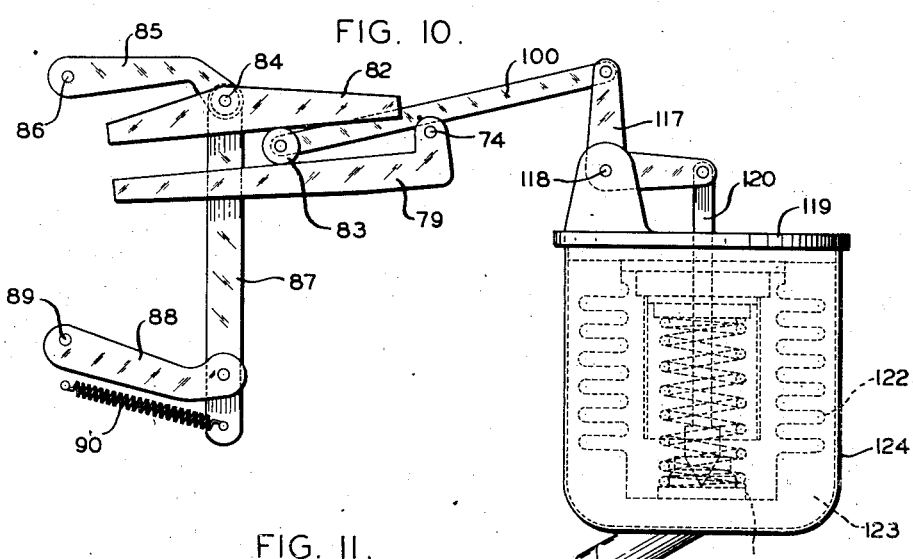
Fig. 10 is a view showing in detail some levers used in Figure 2.

Attached to the lever 73 by means of bolts 80 and 81 is a driving member 79 that has a straight upper surface. This member serves to move a driven member 82 by means of rollers 83 which extend between the parts 79 and 82 as best shown in Figures 3 and 10. The driven member 82 is mounted for movement up and down without changing its angle to the horizontal, and to this end is attached to a shaft 84 which is supported by an arm 85 that is pivoted on a rotatable shaft 86. Also fastened to the shaft 84 is a vertical member 87 whose lower end has pivoted to it an arm 88 which is pivoted to the casting 56 at 89. Arms 85 and 88 along with the member 87 form a parallel lever arrangement so that as the driven member 82 is moved up or down, its angularity will not be changed. A spring 90 extends between the lower end of the member 87 and the casting and serves to take up back-lash between the parts so that there will be no play as the unit is operated.

Movement of the member 82 is used to set the control point of the instrument 9. As is noted above, the part 85 is free of the shaft 86, but transmits motion to that shaft by means of engagement between 85 and the bent over end 91 of the lever 92 which is attached to the shaft 86. The end 91 and the member 85 are held in engagement with each other by means of a spring 93. The outer or front end of shaft 86 has attached to it an arm 94 and has free on it an arm 95 which arms are adjustably connected for movement together by means of a connection 96 which is similar to the one that was described as being between arms 17 and 18. The outer end of the arm 95 is attached to the left end of link 44 whose right end is pivoted to the index pointer 43 of lever 41 and below the pivot point 42.

It will therefore be seen that elongation or contraction of the bellows 55 due to a change in pressure in the chamber 53 can be used to move the lever 41 through the operating connections which have been described above. In order to vary the position of the lever 41, for a given length of the bellows, the adjustable connections 96 is used. To facilitate this adjustment, the lower end of arm 94 is provided with a pointer 97 that cooperates with a scale 98 which is formed on the arm 95. It is noted that a spring 99 surrounds shaft 86 and acts between the casting 56 and lever 85 to bias the assembly in a clockwise direction in Figure 3 in order to keep parts 82, 83 and 79 in engagement with each other at all times.

The amount of movement of the member 82 and, therefore, the amount of control point adjustment that is given to the instrument 9 for a given pressure change in the chamber 55 is varied by moving the roller 83 along members 79 and 82. To this end, the roller 83 is connected by means of a link 100 with a carriage 101 that is supported by guide rods 102 which project from the side of the casting 56. The carriage is shifted along its guide rods by means of a link 103 that is connected at one end to the carriage, and at its other end to a gear sector member 104 which is attached to a shaft 105. This sector may be rotated by means of a pinion 106 that is mounted on a shaft 107, which shaft has a knob 108 on its front end. The shaft 107 is shown as extending through a supporting plate of the instrument with the knob 108 in a position to be accessible from the front of the supporting plate. By mounting the adjusting knob away from the levers 79 and 82 there is no possibility of disturbing the positions of the levers and therefore upsetting the control as the roller 83 is adjusted along them to vary the ratio of the system. A spring 109 is provided to take up any back-lash that may appear in the train of mechanism. To indicate the position of the roller 83 between parts 79 and 82 a pointer 110 is attached to the front end of shaft 105 and is moved by it across a scale 111 that is attached to a chart backing plate of the instrument.

When the flow in pipe 1 is zero the flow in pipe 2 should also be zero regardless of what ratio the latter is to have with the former. Therefore, when the flow in pipe 1 is zero, and member 79 is in its zero position, the roller 83 may be moved from one end to the other of member 79 without changing the position of member 82. In order to insure that this will be the case the member 82 is adjusted on shaft 84 until its lower surface is parallel to the upper surface of member 79, and is then fastened in this position on the shaft. It is noted that by maintaining the member 82 in the same angular position on the shaft 84 to which it was adjusted, while raising and lowering the member, that the calibration of the unit 52 will be linear. That is, the member 82 will be moved equal amounts for equal adjustments of roller 83 along the member 79 for any position of the latter but its zero position. The desirability for such a calibration should be obvious, since no matter what the characteristics of the condition being measured may be, they will be exactly reflected in the adjustment of the control point adjusting lever 41.

In the operation of a control system embodying the present invention, the primary flow through pipe 1 is measured by and indicated by means of the instrument 6, which instrument sets up a variable pressure in the pipe 8 proportional to the value of the flow. This pressure is applied in the chamber 53 of the instrument 9 to adjust the control point of the latter instrument, and therefore to adjust the value at which this instrument will maintain the secondary flow through the pipe 2. A record is made of the primary flow by pen arm 45 of the instrument 9 on the chart 29. As the flow through the pipe 2 varies, the shaft 16 will be rotated and will operate through link 25 to move the pen 28 across chart 29 and at the same time will operate through arm 31 to adjust the control mechanism 36. If it is desired to vary the ratio that the secondary flow has with respect to the primary flow, it is only necessary to rotate the knob 108 to shift the roller 83 along member 79. It will be seen that the instrument 9 has recorded on its chart 29 the values of both of the flows. Also clearly visible from the front of the instrument is the control point to which the flow in pipe 2 is being regulated as well as the ratio which is being maintained between the two flows. A complete picture of the entire control system is therefore readily obtained by inspection of a single instrument. The ratioing 52 of the instrument 9 is, for example, designed to move the secondary control pointer 43 from 25% to 200% of the reading of the primary measuring instrument 6 as shown by the calibration marks on the scale 111. That is, when the unit 52 is adjusted for the lower limit of 25% movement of the pointer, the ratio mechanism will position the control pointer 43 at 25% of full scale when the primary flow in pipe 1 is at a maximum. When the unit 52 is adjusted for the upper limit of 200% movement, the mechanism will position the control pointer 43 at 100% of full scale movement when the flow through pipe 1 is at 50% of its maximum value. The significance of these adjustments will now be considered.

As is well known, the actual ratio of the secondary flow to the primary flow, of course, depends upon the sizes of pipes 2 and 1 and their respective orifices 10 and 3. The controller 9 can then vary this basic ratio from 25% to 200%. This can best be explained by a typical example.

Assume that the two flows in pipes 2 and 1 have a basic ratio of 5 to 1; the secondary flow in pipe 2 having an average value of 375, and the primary flow in pipe 1 having an average value of 75 units. The range for the primary meter 6 will then be 0 to 100 units and the range for the secondary meter will be 0 to 500 units. Since the flow through the primary pipe 1 is recorded by the pen 45 on the chart 29 in instrument 9 this pen will read $75/100$ or 75% of full scale on this chart, or 375 secondary units. Thus if it is desired to maintain the basic ratio of 5 to 1 for the two flows, the ratio controller will be set at 100% on scale 111, because this is the percentage of the primary pen reading in the secondary chart which gives the desired secondary flow.

Now assume that it is desired to increase the basic ratio to 6 to 1. When the primary flow is at its full average value of 75 units, a 6 to 1 ratio of the flow would mean that the secondary should have an average value of 450 units. Since the primary flow is recorded on the secondary chart 29 as 375 units, the ratio setting necessary to maintain the new basic ratio of 6 to 1, therefore, must be $450/375 \times 100$ or 120% of the primary pen reading. To maintain this ratio the pointer 110 will be adjusted to 120 on the scale 111. The limits to which the basic ratio of 5 to 1 could be varied would be from 25% to 200% of the basic ration of 5 to 1 or from 1.25 to 1 to 10 to 1.

Figure 1:
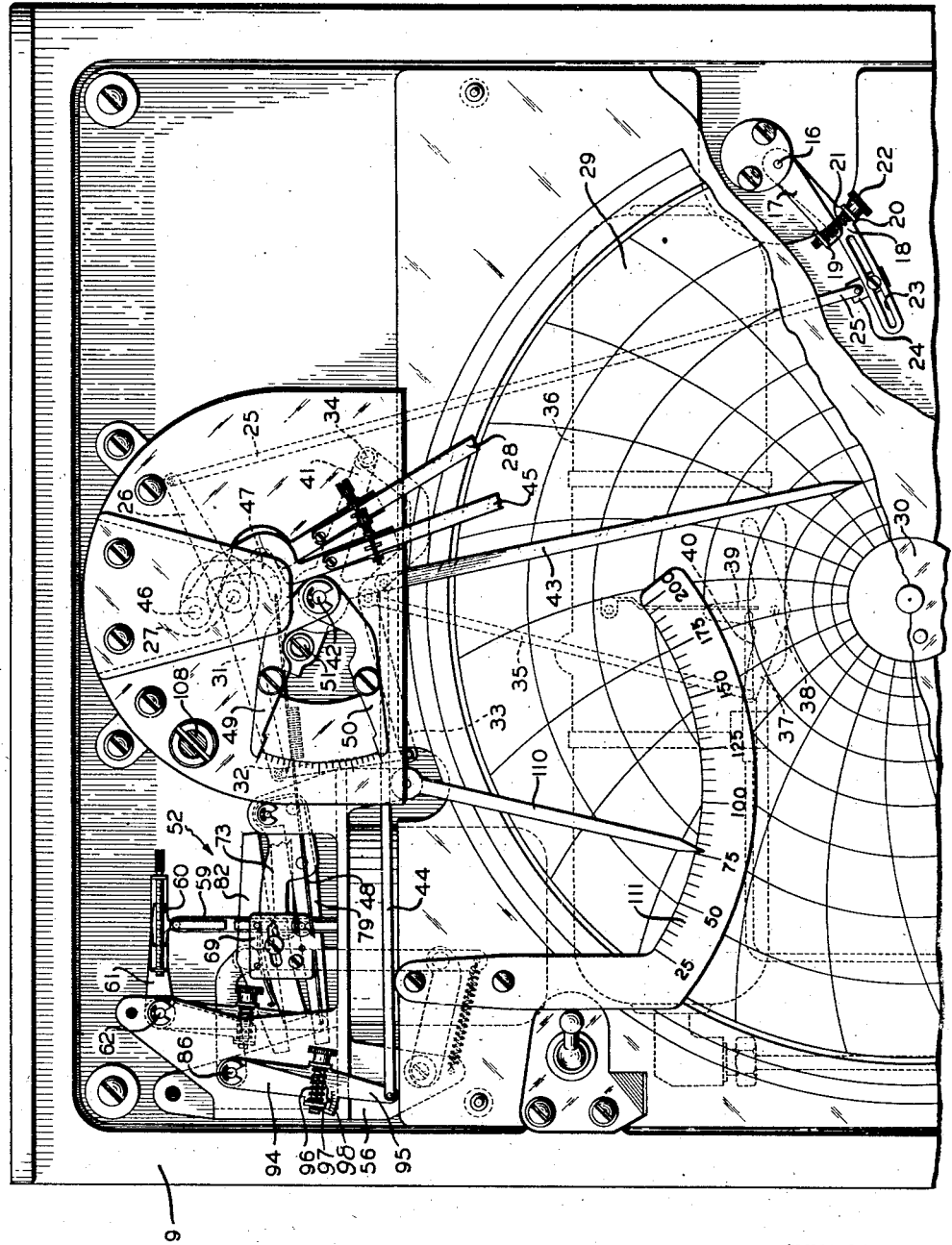
Fig. 1 is a view of the upper part of an instrument embodying the invention.

In the above description, the adjustment that has been made by the ratio flow control unit 52 has been a direct one. In other words, an increase in the primary flow has been used to move the control point of the secondary controller 9 upscale. In some cases, it may be desirable to have an inverse ratio or to move the control point of the instrument 9 down scale as the primary flow increases. In such an event, it will be necessary to connect the link 44, which extends from arm 95, to lever 41 at a point which is above the pivot 42 instead of below the pivot as is shown in Figure 1. This is a minor change and can be done without any appreciable alteration of the various parts.

In some instances, it may be desirable to have the ratio between the flows kept at some predetermined amount plus or minus an additional number of units of the secondary flow. By the proper operation of adjustment 96, this may be accomplished. If the pointer 97 is moved to the zero mark on scale 98, the pointer 43 will be moved to the zero mark on the chart 29 when there is a minimum pressure in the chamber 53. By adjusting the connection 96, the pointer 43 can be moved either above or below zero the desired number of units so that the control of the secondary flow will be the ratio plus or minus a certain number of units throughout the range of the instrument.

In Figures 6, 7, and 8 there is shown an adjustable connection which may be used between rod 59 and lever 61 in place of that shown at 60 in Figure 2. In this connection, the lever 61 is provided with an opening 61A that receives the ends of a slider 112 and a clamping member 113. A screw 114 that receives the upper end of rod 59 on a shoulder formed on its head passes through the slider 112 and the opening 61A, and is threaded in the clamp member 113. When this screw is tightened down, the clamp member serves to prevent movement of the slider and rod 59 along the lever 61. In order to adjust the rod 59 toward and away from the fulcrum on lever 61, there is provided a screw 115 which extends through an opening 116 formed in a bent over end of the lever 61. This screw passes freely through the opening, but is threaded into the ends of the slider 112 and clamp 113. Rotation of the screw will therefore move the slider and clamp in one direction or the other to properly position the rod 59. In the operation of this adjustment, the screw 114 is first loosened and then screw 115 is rotated to give the proper adjustment. Thereafter, the screw 114 is tightened to hold the parts in their adjusted position. The opening 116 is made in the shaft shown in Figure 8 in order that the screw may pass through this opening and may be loose during the time that the adjustment is made.

In the above description of the control system, it was assumed that the ratio between two flows in pipes 1 and 2 would be adjusted manually by rotation of the knob 108. In some cases it is desirable to adjust the ratio between the flows through the two pipes 1 and 2 in response to the variations in the value of another condition. This may be accomplished in the manner shown in Figure 10 in which the right end of link 100 that controls the position of roller 83 is attached to one arm of a bell crank 117. The bell crank is pivoted at 118 to a casting 119, and has on its other arm a rod 120 which engages a socket 121 attached to the end wall of a bellows 122. This bellows forms one wall of a chamber 123 similar to the chamber 53 in the unit 52. The other wall of this chamber is formed by a casing member 124 which is provided with an opening through which a tube 125 may be connected with the chamber.

When the ratio is to be changed in accordance with the value of a third variable condition, and that condition is measured by some suitable instrument such as that described in the above mentioned Moore Patent 2,311,853, that instrument serves to set up an air pressure proportional to the value of the condition which pressure is applied to the chamber 123 to vary the length of bellows 122. As the bellows varies in length, it shifts the roller 83 between members 79 and 82 to adjust the ratio between the primary and secondary flows in a manner that has previously been described.

Figure 11:
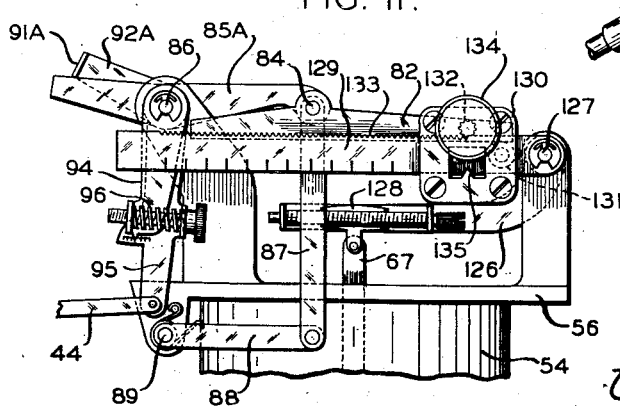
Fig. 11 is a view of a modified type of ratio adjusting mechanism.

The ratio control unit 52 which has been described above was adjusted by means of a knob which was placed in an accessible position on the instrument. In some cases, it may be desirable to have the unit self-contained with the adjusting means on the unit instead of being mounted on another portion of the instrument. Such a construction is shown in Figure 11 which operates in exactly the same manner as that previously described, with the exception of the way the ratio adjustment is made. In the embodiment of Figure 11, the rod 67 extending up from the bellows 55 serves to move a lever 126 that is attached to a shaft 127 which is journaled in the casting 56. Between the rod 67, and the lever 126 there is shown an adjustable connection 128 which is similar to the connection 60 but which may be similar to that shown at 69 or to that shown in Figure 6. Movable with the shaft 127 is an arm 129 upon which is mounted a slider 130 that carries a roller 131 which serves to move the member 82. Therefore, as the rod 67 is raised and lowered due to pressure changes in chamber 53, the arm 129 will be moved to raise and lower roller 131 to change the position of member 82. In order to vary the ratio of movement of member 82 with respect to arm 129, the slider 130 is provided with a pinion 132 that engages with a rack 133 formed on the upper surface of arm 129. The pinion is rotated by means of a knob 134 to shift the slider 130 toward and away from the shaft 128. In order to facilitate a proper adjustment of the slider along the arm, the slider is provided with a pointer 135 that cooperates with a scale formed on the arm 129. This scale may be calibrated in exactly the manner as the scale 111 which was shown in Figure 2. It is noted that in Figure 11, the connection between arm 85A and shaft 86 is formed to the left of the shaft instead of to the right as in Figure 2. To this end, arm 85 is extended to the left of the shaft 86, and is engaged by a bent over portion 91A on the arm 92A, which parts correspond respectively to parts 91 and 92 in Figure 2. The operation of this embodiment of the invention is exactly the same as that previously described.

From the above description, it will be seen that I have provided a simple unit which can be used to adjust the control point of a control instrument in accordance with any desired ratio that is to be produced between the two units. While the unit has been described as being capable of varying the ratio between the primary and secondary conditions from 25 to 200 percent it will be obvious that these limits were arbitrarily chosen and that others could be used in place thereof. It is also of advantage to have a record of both conditions on the same chart along with an indication of the value at which it is desired to keep the secondary condition. This, coupled with the fact that the present instrument is provided with a pointer that shows the ratio which is being maintained between the conditions, makes the instrument extremely complete.

While in accordance with the provisions of the statutes, I have illustrated and described the best form of my invention now known to me, it will be apparent to those skilled in the art that certain changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a control system, means to measure the value of a first condition, means to measure and control the value of a second condition, mechanism operated by the means to measure the value of the first condition to adjust said second means and vary the value at which the second means will control the value of the second condition to maintain the value of the second condition at a fixed ratio to the value of the first condition, means responsive to the value of a third condition, and means operated by said last mentioned means to adjust said mechanism to vary the ratio said mechanism will keep between said first condition and said second condition.

2. In a control system, means to measure the value of a first condition, means to measure the value of a second condition, mechanism operated jointly by said first and second means to control the value of said second condition, said mechanism being constructed and arranged to maintain the value of said second condition at some fixed multiple of the value of said first condition, means responsive to the value of a third condition, and means forming part of said mechanism and adjusted by said last mentioned means whereby the value of said multiple may be adjusted in accordance with the value of said third condition.

3. A control system including a ratio measuring and control instrument provided with a chart that is visible from the front of the instrument and a control unit, control means operated by said control unit to control the value of a secondary condition, a part movable to positions varying with the value of a secondary condition, a first exhibiting means moved by said part and cooperating with said chart to exhibit the value of said secondary condition, an indicating pointer cooperating with the chart to indicate the value at which said control unit is to maintain said secondary condition, mechanism operated in response to the value of a primary condition to adjust said pointer and said control unit and thereby vary the value at which said control unit will maintain said secondary condition, a second exhibiting means operated by said mechanism and cooperating with the chart to exhibit the value of the primary condition, means to adjust said mechanism to vary the ratio it will maintain between said primary and secondary conditions, a second pointer operatively connected to said last mentioned means and operated to various positions as said last mentioned means adjusts said mechanism, and a scale visible from the front of said instrument with which said second pointer cooperates, whereby said second pointer may indicate the ratio maintained between said primary and secondary conditions.

4. A control system including a ratio measuring and control instrument provided with a chart that is visible from the front of the instrument and control unit, a pressure responsive device operated in accordance with the value of a primary flow, an exhibiting element moved by said device across the chart to positions corresponding to the value of said primary flow to exhibit the value thereof, a control means operated by said control unit to control the value of a secondary flow, a second exhibiting element, means to move said second exhibiting element across said chart to exhibit the value at which said secondary flow is being controlled, control point adjusting means for said control unit to change the value at which said secondary flow is to be maintained, a pointer operated by said control point adjusting means to move said pointer across said chart to indicate the value at which said secondary flow is to be maintained, means to connect said pressure responsive device to said control point adjusting means whereby the former can adjust the latter to change the value at which said secondary flow will be maintained, means to adjust said connecting means to vary the ratio of the values that will be maintained between the primary and secondary flows, a pointer movable with said means to adjust said connecting means, and a scale visible from the front of said instrument with which said last mentioned pointer cooperates to indicate the ratio maintained between the primary flow and the secondary flow.

EDWIN C. BURDICK.